US009309381B2

(12) United States Patent
Patel et al.

(10) Patent No.: US 9,309,381 B2
(45) Date of Patent: *Apr. 12, 2016

(54) EPOXY RESIN COMPOSITIONS USING SOLVATED SOLIDS

(71) Applicant: AIR PRODUCTS AND CHEMICALS INC., Allentown, PA (US)

(72) Inventors: Pritesh G. Patel, Breinigsville, PA (US); Edze Jan Tijsma, Zeist (NL)

(73) Assignee: Air Products and Chemicals, Inc., Allentown, PA (US)

( * ) Notice: Subject to any disclaimer, the term of this patent is extended or adjusted under 35 U.S.C. 154(b) by 93 days.

This patent is subject to a terminal disclaimer.

(21) Appl. No.: 14/041,139

(22) Filed: Sep. 30, 2013

(65) Prior Publication Data

US 2014/0171551 A1    Jun. 19, 2014

Related U.S. Application Data

(60) Provisional application No. 61/738,653, filed on Dec. 18, 2012.

(51) Int. Cl.
| | |
|---|---|
| *C08G 59/50* | (2006.01) |
| *C08G 59/56* | (2006.01) |
| *C08L 63/00* | (2006.01) |
| *C09D 163/00* | (2006.01) |
| *C09J 163/00* | (2006.01) |
| *C08K 7/14* | (2006.01) |
| *C08K 5/16* | (2006.01) |
| *C08K 7/02* | (2006.01) |
| *C08K 7/06* | (2006.01) |
| *C08L 1/02* | (2006.01) |
| *C08L 63/04* | (2006.01) |

(52) U.S. Cl.
CPC . *C08K 7/14* (2013.01); *C08G 59/50* (2013.01); *C08G 59/56* (2013.01); *C08K 5/16* (2013.01); *C08K 7/02* (2013.01); *C08K 7/06* (2013.01); *C08L 1/02* (2013.01); *C08L 63/00* (2013.01); *C08L 63/04* (2013.01)

(58) Field of Classification Search
USPC ............... 523/400, 428; 428/297.4, 413, 414, 428/415, 416, 417, 418
See application file for complete search history.

(56) References Cited

U.S. PATENT DOCUMENTS

| | | | |
|---|---|---|---|
| 2,890,194 A | 6/1959 | Phillips et al. | |
| 4,417,010 A * | 11/1983 | Shimp ........................ 523/466 | |
| 4,528,308 A | 7/1985 | Waddill | |
| 4,540,750 A | 9/1985 | Ham | |
| 4,608,300 A | 8/1986 | Gruber | |
| 4,672,101 A | 6/1987 | Wang et al. | |
| 4,677,170 A | 6/1987 | Monnier et al. | |
| 4,791,154 A | 12/1988 | Corley et al. | |
| 4,920,164 A | 4/1990 | Sasaki et al. | |
| 5,087,688 A | 2/1992 | Gruber et al. | |
| 5,512,372 A | 4/1996 | Blanc et al. | |
| 5,618,905 A | 4/1997 | Marsella et al. | |
| 5,629,379 A | 5/1997 | Harper | |
| 5,672,431 A | 9/1997 | Lin | |
| 6,562,884 B1 | 5/2003 | Oberwil et al. | |
| 2002/0032279 A1* | 3/2002 | Hwang ..................... C08F 8/40 525/107 |
| 2008/0114094 A1 | 5/2008 | Shah et al. | |
| 2012/0328811 A1* | 12/2012 | Patel et al. .................. 428/36.9 | |

FOREIGN PATENT DOCUMENTS

| | | | | |
|---|---|---|---|---|
| EP | 0737702 | A2 | 10/1996 | |
| JP | 61179223 | | 8/1986 | |
| JP | 62121721 | | 6/1987 | |
| JP | 62121721 | A2 | 6/1987 | |
| JP | 63017938 | | 2/1988 | |
| JP | 8325360 | A2 | 12/1996 | |
| JP | 10007768 | A | 1/1998 | |
| JP | 10505119 | | 5/1998 | |
| JP | 2000109578 | A | 4/2000 | |
| JP | 2002187936 | | 7/2002 | |
| JP | 2010540724 | | 12/2010 | |
| WO | 9607684 | A1 | 3/1996 | |
| WO | WO 2006005559 | A1 * | 1/2006 | ............. C08G 59/56 |
| WO | 2009045817 | A1 | 4/2009 | |
| WO | 2009/089145 | A1 | 7/2009 | |
| WO | 2011068644 | A1 | 6/2011 | |
| WO | 2012174989 | A1 | 12/2012 | |

OTHER PUBLICATIONS

Michaels, Robert, "Epoxies & Glass Transition Temperature" Design News, UBM Canon, Jul. 5, 2013, pp. 1-4.
Momentive Performance Materials, "EPON Resin 1510 Technical Data Sheet", Dec. 2005.
Momentive Performance Materials, "EPON Resin 828 Technical Data Sheet", Sep. 2005.
Boyle, et al, Epoxy Resin, ASM Handbook, vol. 21: Composites, pp. 78-89, 2001, ASM International.

(Continued)

*Primary Examiner* — Michael J Feely
(74) *Attorney, Agent, or Firm* — Michael K. Boyer

(57) ABSTRACT

An epoxy resin composition having a curing component and an epoxy component is disclosed. The curing component includes an amount of about 8% to about 70% by weight of the composition of a primary curing agent and about 0.001% to about 5% by weight of the composition of a secondary curing agent. The present disclosure includes the use of solid secondary curing agents, in particular solvated secondary curing agents, and methods to formulate such a solvated solid to result in a liquid curing component. The epoxy composition also includes about 30% to about 92% by weight of the composition of the epoxy component. A number of equivalents of reactive curative groups in the curing component is from about 0.50 to 0.98 times the number of epoxide equivalents present in the epoxy component. An epoxy product formed from the epoxy resin composition is also disclosed.

36 Claims, 1 Drawing Sheet

(56) References Cited

OTHER PUBLICATIONS

Bregg, Robert K., Horizons in Polymer Research, 2005, Nova Science Publishing, p. 170.

European Search Report, dated Apr. 3, 2014.
Tanaka, Y., "Synthesis and Characteristics of Epoxides", Epoxy Resins Chemistry and Technology, C. A. May, ed., 1988, Marcel Dekker, pp. 52-73.

* cited by examiner

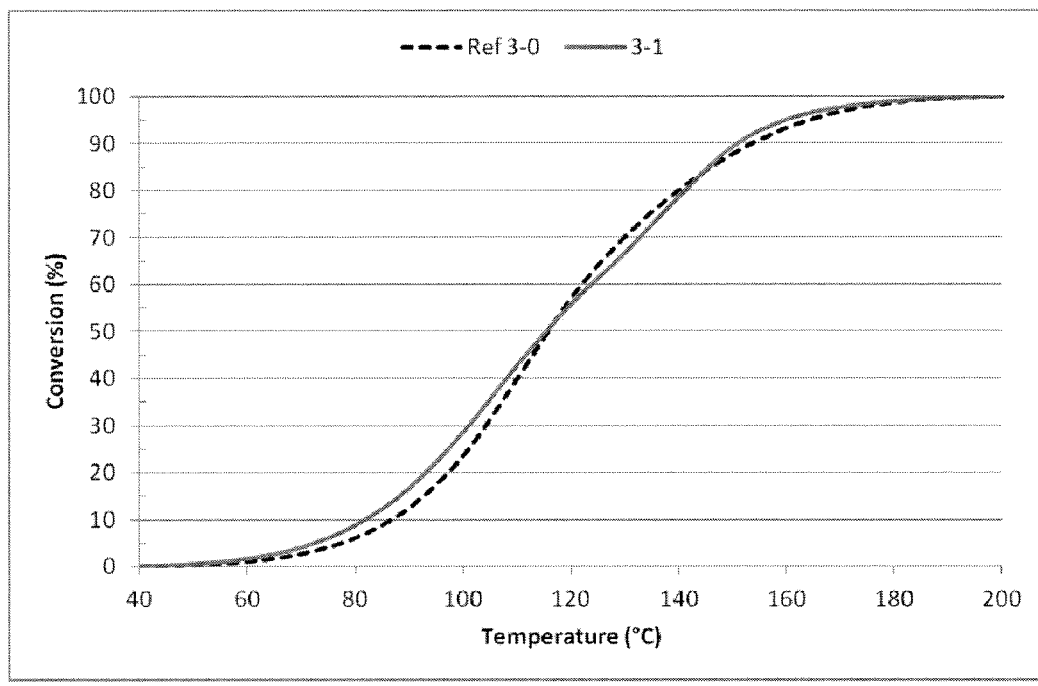

EPOXY RESIN COMPOSITIONS USING SOLVATED SOLIDS

This application claims benefit of U.S. Patent Application No. 61/738,653, filed on Dec. 18, 2012. The disclosure of Application No. 61/738,653 is hereby incorporated by reference.

CROSS-REFERENCE TO RELATED APPLICATIONS

Co-pending and Commonly Assigned U.S. application Ser. No. 13/168,174, filed on Jun. 24, 2011, and entitled "Epoxy Resin Compositions"; hereby incorporated by reference, relates generally to an epoxy resin composition for manufacturing composite parts and, more particularly, to a liquid curing component that increases the thermal, mechanical and chemical properties of cured epoxy and epoxy composite parts. In particular, it discloses the use of a liquid secondary curing agent to provide a product with a high glass transition temperature and a good chemical resistance, along with a method to decrease the use level of curing agent.

BACKGROUND OF THE INVENTION

The present disclosure relates generally to an epoxy resin composition for manufacturing composite parts and, more particularly, to a curing component that increases the thermal, mechanical and chemical properties of cured epoxy and epoxy composite parts.

Polymer composites offer several advantages compared to metals and ceramics in that polymer composites are lightweight, have high specific stiffness and strength, are easy to manufacture, allow tailoring of the properties by varying the resin's chemistry, reinforcement fibers, and design flexibility for different applications and also have low coefficients of thermal expansion.

Polymer composites, in particular thermosetting polymer material, prepared through crosslinking reaction with an appropriate curing agent, based on amine or polyamine(s), and with an epoxy resin desirably have the following properties: (a) low to high curing temperature, where the curing reaction can be carried out at a temperature of 5 to 150° C.; (b) low volume shrinkage rate, where the volume shrinkage rate of cured epoxy resin is typically 1 to 3% resulting in low internal stress in fiber matrix composites; (c) good wetting, adhesion to provide good shear strength between fiber and matrix; (d) good insulating properties; (e) good chemical resistance; and (f) good thermal properties.

The properties of cured epoxy systems allow their use in various fields and they are extensively used in industry such as adhesive, coating, and composite applications.

Many composite applications require a high degree of resistance to heat. Epoxy amine systems develop relative high glass transition temperature (Tg) (about 150° C.) when cured at high temperature (about 150° C.). However, higher Tg (greater than 170° C.) is desired for many applications to successfully replace heavy metals and metal alloys. To achieve such high Tg, extensive crosslinking is required, which usually tends to cause embrittlement.

Typically, high Tg will usually provide a high chemical resistance, but not with all chemicals. For example, acetone and methanol can disturb the crosslinked network (e.g., penetration of the matrix to the fibers).

Aromatic, cycloaliphatic, aliphatic, heterocyclic and polyether polyamines have been used in the past for the curing of epoxy resins. It is well known that aromatic amines provide better chemical resistance and thermal stability than cycloaliphatic and aliphatic or other polyamines. Several approaches have been considered to increase the glass transition temperature and chemical resistance of epoxy formulations. For structural applications it is desirable, particularly for reinforced composites, to produce an epoxy having a high Tg, improved chemical resistance, while maintaining the mechanical properties for overall composite performance. Although higher Tg can be achieved by formulating epoxy resins such as bisphenol-A (BPA), bisphenol-F (BPF) with epoxy novolac. The main drawback with this approach is a large increase in the viscosity of the formulation. High viscosity leads to processing challenges and increases flaws in the composite matrix due to the resin's very high viscosity. Numerous technical challenges exist to increasing the Tg and chemical resistance without sacrificing other properties.

Accelerators are generally known for use to accelerate curing agents which have very slow reactivity with epoxy resins (e.g., dicyanamide (DICY), anhydride, and aromatic amines). Epoxy resin systems are not generally known to be formulated to increase the Tg of liquid curing agents epoxy system. Known epoxy systems having accelerator compounds included in the formulation are single component (1K) systems, typically found in adhesive and powder coating where they use the accelerator to increase the reactivity of amine in the latent epoxy system.

U.S. Pat. No. 5,512,372, which is hereby incorporated by reference in its entirety, discloses a hardenable, or polymerizable epoxy resin-based composition, characterized in that its hardener system comprises a combination in synergic quantities of at least one imidazole which, alone, can cause the polymerization of the epoxy resin only at a temperature above about 75° C. The U.S. Pat. No. 5,512,372 shows the use of imidazole as accelerator for one component polyamines, such as dicyanamide (DICY), and modified polyamine ANCAMINE® 2014 and does not disclose any thermal, mechanical or chemical resistance improvements. The U.S. Pat. No. 5,512,372 discloses one component systems and is specific to the latent curing agents. Further, the U.S. Pat. No. 5,512,372 only discloses a one component system having polyamine which is latent at room temperature for more than 21 days and none of the examples disclose amines that are active at room temperature with epoxy resins. The one component system disclosed in the U.S. Pat. No. 5,512,372 includes high loadings of imidazole and undesirably low Tg for the cured formulation. In addition, the U.S. Pat. No. 5,512,372 does not disclose compositional ranges that include off-stoichiometric ratios of curing agent to epoxy.

International Patent Application Publication WO2009/089145, which is hereby incorporated by reference in its entirety, discloses an epoxy resin mixture including cycloaliphatic epoxy resins, a cycloaliphatic anhydride hardener and a catalyst. WO2009/089145 further discloses adding two or more epoxy resins and a cycloaliphatic anhydride hardener to form a curable composition, wherein the epoxy resins include at least one cycloaliphatic epoxy resin and epoxy novolac resin; and thermally curing the composition at a temperature of at least 150° C. to result in a thermoset resin having a glass transition temp of at least 210° C. However, WO2009/089145 does not disclose any thermal, mechanical or chemical resistance improvements. The disclosure of WO2009/089145 illustrates a known approach to enhance the Tg of a mixture of epoxies (cycloaliphatic plus high functionality epoxy novolac resins) with cycloaliphatic anhydride and an accelerator. However, the WO2009/089145 does not disclose compositional ranges that include off-stoichiometric ratios of curing agent to epoxy. WO2009/089145 utilizes an anhydride curing agent, such as nadic methyl anhydride, which is known to provide higher Tg if cured using certain curing conditions. Multifunctional resin was used in WO2009/089145 to increase the Tg, but the mechanical properties disclosed using anhydride curing agent are undesirably low.

U.S. Pat. No. 4,540,750, which is hereby incorporated by reference in its entirety, discloses a method for making an adduct using diethyltoluenediamine (DETDA). The U.S. Pat. No. 4,540,750 discloses the DETDA as a polyamine curing agent. Since epoxy reactions with DETDA are very sluggish, the U.S. Pat. No. 4,540,750 discloses the use of an adduct to increase the reactivity of DETDA. In example A of this invention, 1-methyl imidazole (AMI-1) was used with DETDA adduct; however, the thermal properties, including Tg, resulting from the mixture were undesirably low compared to the examples without use of imidazole and did not disclose the effect on mechanical properties.

U.S. Pat. No. 4,528,308, which is hereby incorporated by reference in its entirety, discloses epoxy resin formulations, particularly curing agent formulations where large amounts of imidazole are used and polyetheramines were added to enhance the flexibility/toughness. 1-methyl imidazole (AMI-1) and 2-ethyl 4-methyl imidazole (EMI-24) are disclosed as being utilized at high loading in the formulation. The imidazole is used to initiate the cure of the epoxy resin and a very low amount of polyether amine is added back to the formulation to improve the flexibility (i.e. % elongation). In the U.S. Pat. No. 4,528,308, the imidazole is used as the primary reactant while the polyether amine is used as the secondary to improve the flexibility/toughness of the system. U.S. Pat. No. 4,528,308 does not disclose glass transition temperature or chemical resistance improvements.

U.S. Pat. No. 5,672,431, which is hereby incorporated by reference in its entirety, discloses epoxy resins and, more particularly, to epoxy resins incorporated with an imidazole accelerator in combination with chromium acetylaacetonate (Cr (acac)$_3$). The U.S. Pat. No. 5,672,431 discloses a solid amine hardener of 4,4'-diaminodiphenyl sulfone (DDS) with imidazole and tertafunctional resin. The resultant cured resin had an increased fracture toughness, but the glass transition temperature dropped significantly. The U.S. Pat. No. 5,672,431 discloses a multifunctional resin in combination with aromatic amine to achieve a higher fracture toughness and interlaminar shear properties, but with undesirably low strength and Tg.

Epoxy compositions, epoxy products and epoxy composite products having desirable physical, thermal and chemical properties not suffering from the above drawbacks would be desirable in the art. These needs are addressed by the embodiments of the present invention as described below and defined by the claims that follow.

BRIEF SUMMARY OF THE INVENTION

One aspect of the present disclosure includes an epoxy resin composition having a curing component and an epoxy component. The curing component includes an amount of about 8% to about 70% by weight of the composition of a primary curing agent and about 0.001 to about 5% by weight of the composition of a secondary curing agent. The present disclosure includes the use of solid secondary curing agents, in particular solvated secondary curing agents, and methods to formulate such a solvated solid to result in a liquid curing component. The epoxy composition also includes about 30% to about 92% by weight of the epoxy component. A number of equivalents of reactive curative groups present in the curing component is from about 0.50 to 0.98 times a number of epoxide equivalents present in the epoxy component.

Another aspect of the present disclosure includes an epoxy product that includes the reaction product of an epoxy resin composition, the epoxy resin composition comprising a curing component and an epoxy component. The curing component includes about 8% to about 70% by weight of the composition of a primary curing agent and about 0.001 to about 5% by weight of the composition of a secondary curing agent. The epoxy component includes about 30% to about 92% by weight of the composition of an epoxy component. The epoxy resin composition includes a number of equivalents of reactive curative groups that are present in an amount in the curing component from about 0.50 to 0.98 times a number of epoxide equivalents that are present in the epoxy component.

A further aspect of the present disclosure includes an epoxy product wherein the product selected from the group consisting of an adhesive, a laminate, a coating, a casting, a circuit board, a varnish, an encapsulant, a semiconductor, a general molding powder, a filament wound pipe, a storage tank, and a liner.

Other features and advantages of the present invention will be apparent from the following more detailed description of the preferred embodiment, taken in conjunction with the accompanying drawings which illustrate, by way of example, the principles of the invention. The embodiments and features of the present invention can be used alone or in combinations with each other.

BRIEF DESCRIPTION OF SEVERAL VIEWS OF THE DRAWINGS

FIG. 1 is a graph illustrating epoxy resin conversion as a function of time for one aspect of the invention shown in Table 3.

DETAILED DESCRIPTION OF THE INVENTION

Provided are epoxy resin compositions, epoxy products and epoxy composite products having desirable thermal, physical and chemical properties. The epoxy resin compositions include at least one epoxy resin, a curing component that includes at least one primary curing agent, such as polyamine, and at least one secondary curing agent, such as imidazole, to enhance the thermal properties, chemical properties in various reagents, while maintaining the mechanical properties necessary for structural composite parts. In addition, the epoxy resin composition maintains the low viscosity and pot life of the formulation typically required for composite fabrication. The epoxy resin composition of the present disclosure is suitable to fabricate composite parts by filament winding, resin infusion, hand lay-up, vacuum assisted resin transfer process, pultrusion and prepreg. The specific parts such as pipes, fittings, tanks, high pressure vessels, wind blade, boat, composite tools and other structural composites for automotive and aerospace applications.

The epoxy resin compositions include an epoxy resin, a curing component that includes a primary curing agent comprising a polyamine. The polyamine can comprise at least one member selected from the group consisting of aliphatic, aromatic, cycloaliphatic, and polyetheramines. The amount of polyamine can range from about 8% to about 70% by weight.

The epoxy resin composition also includes at least one secondary curing agent, such as imidazole, to enhance the thermal properties (e.g., to obtain a Tg of greater than about 40 to about 200 C and typically about 80 to about 160 C), chemical properties in various reagents, while maintaining the mechanical properties necessary for structural composite parts. The glass transition temperature (Tg) of a cured epoxy resin composition typically ranges from about 40 to about 200 C. The Tpeak relates to the peak temperature, which is caused by an exothermic energy release, that occurs during the epoxy curing process typically ranges from about 50 to about 180 C. In addition, the epoxy resin composition maintains the low viscosity (e.g., about 100 to about 2,000 cps and typically about 100 to 500 cps) and pot life of the formulation typically required for composite fabrication (e.g., a pot life of about 20 minutes to about 8 hours and typically 20 to 300 minutes). The epoxy resin composition of the present disclosure is suitable to fabricate composite parts by filament winding, resin infusion, hand lay-up, vacuum assisted resin transfer process, pultrusion and prepreg. The specific parts such as pipes, fittings, tanks, high pressure vessels, wind blade, boat, composite tools and other structural composites for automotive and aerospace applications.

Another embodiment of the present disclosure includes fiber reinforced epoxy composites impregnated with an epoxy system and comprising a mixture of a primary curing agent and a secondary curing agent, e.g., an imidazole compound or tertiary amine, which results in improved fiber composite properties.

The resin composition of the present disclosure exhibits excellent thermal and chemical properties without altering the processing properties such as viscosity and pot life. For example, as a result of good fiber wetting properties, the epoxy resin composition provides an improvement in fiber matrix adhesion, inter-laminar shear strength (ILSS), by 10% or more.

Embodiments of the disclosure include epoxy products having a glass transition temperature (Tg) that is higher than known epoxy systems and can include Tg greater than about 175° C. with bi-functional epoxy. In addition, epoxy products, according to certain aspects of the invention, have chemical resistance greater than chemical resistance of known epoxy systems.

Embodiments of the disclosure include epoxy resin compositions that desirably utilize off-stoichiometry with the amine containing curing agent. Unlike in conventional systems having only one or a mixture of polyamines where all the components contain reactive sites, embodiments of the present disclosure include compositional ratios of components, including off-stoichiometric concentrations that can be used to vary the properties of the cured system. For example, in one embodiment, the epoxy resin compositions having off-stoichiometric compositional concentrations permit an amount of the curing agent composition that partially functions as reactive diluents, and results in systems with better flexibility, better appearance and also better adhesion and abrasion.

Embodiments of the disclosure include epoxy products having a pot life that is equal to or greater than the pot life of known two component epoxy resin systems. For example, the pot life of an epoxy product according to an embodiment of the present disclosure may have up to two times or more the pot life of an epoxy system that is used in stoichiometric ratios and does not include the secondary curing agents.

Embodiments of the disclosure include epoxy products having a glass transition temperature of from greater than about 40° C. to about 280° C. or more. Embodiments may include a glass transition temperature of the epoxy product greater than about 170° C. or greater than about 220° C. or greater than about 280° C.

The formulation provided in the present disclosure has a lower cost in use (CIU) than known epoxy systems and reduces or, if desired, eliminates the need for the use of multifunctional resins which have higher viscosity and can cause processing problems, while maintaining the mechanical properties of the composite parts (e.g., improved inter laminar shear strength (ILSS)). If desired, the epoxy composition can be substantially free of multifunctional resins. By "substantially free" it is meant that the epoxy composition contains less than about 10 w % multifunctional resins, typically less than about 5 wt. % and in some cases about 0 wt. %. In addition, low temperature cure (e.g., a curing temperature of less than about 150° C. and typically less than about 125° C.) and faster throughput make the product more attractive to many composite processing techniques (e.g., due to a desirable curing rate as illustrated by the conversion versus time graph of FIG. 1). This approach permits the formulation to be tailored in order to balance the performance necessary for composite applications.

Embodiments of the disclosure include epoxy resin compositions that require a reduced amount of crosslinking curing component than known epoxy systems (e.g., the number of equivalents of reactive curative groups in the curing component can range from about 0.50 to about 0.98 times a number of epoxide equivalents present in the epoxy component). In addition, the utilization of the combination of the primary curing agent and secondary curing agent, as disclosed, permits decreased processing time, and increases the process throughput.

The following definitions and abbreviations are provided in order to aid those skilled in the art in understanding the detailed description of the present invention.

AHEW—amine hydrogen equivalent weight
AMI-2—2-methyl imidazole
ANCAMINE® 2655—Aliphatic amine
DGEBA—diglycidyl ether of bisphenol-A,
EEW—epoxy equivalent weight
IPDA—Isophorone diamine
JEFFAMINE® D230—poly(alkylene oxide) available from Huntsman Corp.
PHR—parts per hundred weight resin
PACM—4,4'-methylenebiscyclohexanamine
Tg—Glass Transition temperature
1K—one component
2K—two components Stoichiometric epoxy formulations include concentrations of curing agent added to epoxy in such an amount that for each epoxy group in the system there is one reactive hydrogen atom in the curing agent. The curing agents are generally added to the formulation in such an amount that there is one reactive hydrogen atom in the curing component for each epoxy group in the epoxy resin component. The stoichiometric quantity can be determined from, for example, the chemical structure and analytical data of the component. For example, imidazole provided as a secondary curing agent in the present formulation may not have reactive hydrogen to cure with an epoxy group. Without wishing to be bound by any theory or explanation it is believed that the secondary curing agent provides a catalytic effect on epoxy resin. In formulations according to the present disclosure, a primary curing agent is provided in an off-stoichiometric concentration with respect to an epoxy resin component and a controlled concentration of secondary curing agent is further added. The epoxy resin composition is cured, wherein the primary curing provides crosslinking of the epoxy component. While not wishing to be bound by theory, it is also believed that the secondary curing agent provides a catalytic effect on the epoxy component, resulting in a certain degree of homopolymerization, that in combination with the crosslinking of the primary curing agent providing a desirably high glass transition temperature without embrittlement, while maintaining structural performance and other properties. The combination of the primary curing agent and the secondary curing agent in controlled amounts according to the present disclosure results in the desirable combination of thermal properties and chemical properties in various reagents, while maintaining the mechanical properties necessary for structural composite parts.

The curing component includes at least one primary curing agent and at least one secondary curing agent. The primary curing agent is provided in an amount from about 8% to about 70% by weight of the composition (i.e., epoxy component+curing component), or about 15% to about 50% by weight of the composition. The primary amine can consist of a single amine, or it can be a mixture of amines.

The primary curing agent can comprise a polyamine. The polyamine can comprise at least one member selected from the group consisting of aliphatic, aromatic, cycloaliphatic and polyetheramines. The amount of polyamine can range from about 8% to about 70% by weight. These liquid compositions can be used alone or in combination with other primary curing agents.

In the epoxy resin composition according to certain embodiments of the disclosure, only the primary curing agent is believed to take part in the stoichiometric balance. The secondary curing agent does not contain labile hydrogen that takes part in the reaction and is generally not considered for the stoichiometric calculations. However, the secondary curing agent, although not having reactive groups, acts as a cross-linker through the effect of the tertiary amines, in the homopolymerization of the epoxy component. In this disclosure, the adjustment from the known stoichiometry is a balance of the amount of curing component to epoxy component to obtain a cured product having desirable properties. The adjustment is accomplished by providing an amount of the primary curing agent (e.g., cross-linker) to a corresponding amount of secondary curing agent (e.g., catalytical homopolymerization component), together leading to a full or near full conversion of all the epoxy groups to form the desired higher performance matrix.

The secondary curing agent is provided in an amount about 0.001 to about 5% by weight of the composition, or about 0.5 to about 2.5% by weight. The secondary curing agent would act as a catalyst with epoxy resin. According to certain embodiments of the present disclosure, a controlled amount of curing component is provided to balance the desired properties. For example, in one embodiment, the number of equivalents of reactive curative groups in the curing component is from about 0.50 to about 0.98 times or from about 0.70 to about 0.95 times the number of epoxide equivalents present in the epoxy component, with from about 0.80 times the number of epoxide equivalents present in the epoxy component to a stoichiometric amount being particularly preferred. The number of equivalents of reactive curative groups in the curing component can be readily determined by any known method for calculating the number of reactive curative groups. The exact amount of constituents in accordance with the above general requirements will depend on the application for which the cured resin is intended.

The secondary curing agent can be a liquid or a solid. A solid secondary curing agent can be solvated to enable formulation with the primary curing agent. While solid curing agents are typically solvated, if desired a liquid curing agent can be combined with a suitable carrier or solvent. The method of solvation can be by pre-dissolving the secondary curing agent in a suitable carrier. Examples of such a carrier can be a solvent, a plasticizer or another compound. Specific examples of suitable carriers comprise at least one member selected from the group consisting of ethyl alcohol, benzyl alcohol and a polyether diamine. In general, the amount of carrier is tailored to satisfy the properties desired in the cured epoxy resin (e.g., refer to Examples 4 and 6 infra), and will range from about 30 to about 99.99 and typically about 40 to about 60 percent by weight of the secondary curing agent composition. The specific amount of carrier will vary depending upon the curing agent being solvated and whether the carrier is removed (e.g., temporary and substantially removed prior to curing an epoxy resin). When the carrier is temporary, the amount of carrier typically ranges from about 30 to about 99.99 and typically about 40 to about 60 percent by weight of the secondary curing agent composition and typically equal or more than an amount which completely dissolves the secondary curing agent. When the carrier is not removed, the amount typically ranges from 30 to about 99.99 and typically about 40 to about 60 percent by weight of the secondary curing agent composition and typically equal or more than an amount which completely dissolves the secondary curing agent.

The epoxy component is from about 92% to 30% by weight of the epoxy resin composition, preferably between about 85% to 50% by weight. The epoxy resin can be a single resin, or it can be a mixture of mutually compatible epoxy resins.

While not wishing to be bound by theory, it is believed that the desirable combination of mechanical and chemical properties results from an interaction between crosslinking amines parts of the composition and the tertiary amines (imidazoles or others) that lead to homopolymerization reactions in the epoxy component. This interaction permits the reduction in stoichiometry, and results in improved thermal as well as the physical and, in certain embodiments, the chemical properties over conventional stoichiometric amine cured systems. While not wishing to be bound by theory, it is believed that the reactions are intermolecular and are coupled within the matrix.

The primary curing agent includes at least one amine. In certain embodiments of the present disclosure, the polyamine used includes at least one polyamine selected from one or more of an aliphatic polyamine such as diethylenetriamine (DETA), triethylenetetramine (TETA), teraethylenepentamine (TEPA), pentaethylenehexamine (PEHA), hexamethylenediamine (HMDA), N-(2-aminoethyl)-1,3-propanediamine ($N_3$-Amine), N,N'-1,2-ethanediylbis-1,3-propanediamine ($N_4$-amine), or dipropylenetriamine; an arylaliphatic polyamine such as m-xylylenediamine (mXDA), or p-xylylenediamine; a cycloaliphatic polyamine such as 1,3-bisaminocyclohexylamine (1,3-BAC), isophorone diamine (IPDA), or 4,4'-methylenebiscyclohexanamine (PACM), 4,4'-Methylenebis-(2-methyl-cyclohexanamine); an aromatic polyamine such as m-phenylenediamine, diaminodiphenylmethane (DDM), or diaminodiphenylsulfone (DDS); a heterocyclic polyamine such as N-aminoethylpiperazine (NAEP), or 3,9-bis(3-aminopropyl)2,4,8,10-tetraoxaspiro (5,5)undecane; a polyalkoxypolyamine where the alkoxy group can be an oxyethylene, oxypropylene, oxy-1,2-butylene, oxy-1,4-butylene or co-polymers thereof such as 4,7-dioxadecane-1,10-diamine, 1-propanamine,3,3'-(oxybis(2,1-ethanediyloxy))bis (diaminopropylated diethylene glycol ANCAMINE® 1922A), poly(oxy(methyl-1,2-ethanediyl)), alpha-(2-aminomethylethyl) omega-(2-aminomethylethoxy) (JEFFAMINE® D 230, D-400), triethyleneglycoldiamine and oligomers (JEFFAMINE® XTJ-504, JEFFAMINE® XTJ-512), poly(oxy(methyl-1,2-ethanediyl)), alpha,alpha'-(oxydi-2,1-ethanediyl)bis(omega- (aminomethylethoxy)) (JEFFAMINE® XTJ-511), bis(3-aminopropyl)polytetrahydrofuran 350, bis(3-aminopropyl)polytetrahydrofuran 750, poly(oxy(methyl-1,2-ethanediyl)), a-hydro-w-(2-aminomethylethoxy) ether with 2-ethyl-2-(hydroxymethyl)-1,3-propanediol (3:1) (JEFFAMINE® T-403), and diaminopropyl dipropylene glycol. JEFFAMINE® is a registered trademark of Huntsman Petrochemical LLC.

Particularly suitable polyamines include at least one polyamine selected from diethylenetriamine (DETA), triethylenetetramine (TETA), 1,3-bisaminocyclohexylamine (1,3-BAC), isophoronediamine (IPDA), 4,4'-methylenebiscyclohexanamine(PACM), 3,3' Dimethyl PACM (ANCAMINE® 2049), N-aminoethylpiperazine (NAEP), 4,7-dioxadecane-1,10-diamine,l-propanamine,3,3'-(oxybis(2,1-ethanediyloxy)) bis-(ANCAMINE® 1922A), poly(oxy(methyl-1,2-ethanediyl)),alpha-(2-aminomethylethyl)omega-(2-aminomethylethoxy (JEFFAMINE® D 230, D-400), triethylene glycol diamine (JEFFAMINE® XTJ-504), and poly(oxy(methyl-1,2-ethanediyl))alpha,alpha'-(oxy(di-2,1-ethanediyl))bis (omega-(aminomethylethoxy)). (JEFFAMINE® XTJ-511) or mixture thereof. ANCAMINE® is a registered trademark of Air Products and Chemicals, Inc.

Additional amines suitable for forming the selectively modified amine are polyamines comprising at least one or more multifunctional amine having the following structure:

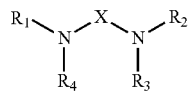

where $R_1$ is $CH_2CH_2CH_2NH_2$, $R_2$, $R_3$ and $R_4$ independently are H or $CH_2CH_2CH_2NH_2$; and X is $CH_2CH_2$ or $CH_2CH_2CH_2$. In one embodiment $R_2$ and $R_3$ are not H simultaneously.

In one embodiment, the secondary curing agent includes at least one imidazole. One embodiment includes a substituted imidazole and may be selected from one or more of 1-methyl imidazole, 2-methyl imidazole, 2-alkyl imidazole where the alkyl group can be an alkyl with 10 to 18 carbon atoms, 2-ethyl-4-methyl imidazole, 2-phenyl imidazole and 1-phenyl-2-methyl imidazole, 2-heptadecylimidazole, 1-cyanoethyl-2-phenylimidazole-trimellitate, 2-(β-(2'-methylimidazoyl-(1')))-ethyl-4-6-diamino-s-triazine, 2,4-dimethylimidazole 2-undecylimidazole, 2-heptadecenyl-4-methylimidazole, 2-heptadecylimidazole, 2-phenyl-4-methylimidazole, 1-benzyl-2-methylimidazole, 2-ethylimidazole, 2-isopropylimidazole, 2-phenyl-4-benzylimidazole, 2-vinylimidazole, 1-vinyl-2-methylimidazole, 1-propyl-2-methylimidazole, 1-(3-aminopropyl)-imidazole, butylimidazole 1-cyanoethyl-2-methylimidazole, 1-cyanoethyl-2-ethyl-4-methylimidazole, 1-cyanoethyl-2-undecylimidazole, 1-guanaminoethyl-2-methylimidazole, 1-cyanoethyl-2-isopropylimidazole, 1-cyanoethyl-2-phenylimidazole, 1-aminoethyl-2-methylimidazole, 2-phenyl-4,5-dihydroxymethylimidazole, 2-phenyl-4-methyl-5-hydroxymethylimidazole, 2-phenyl-4-benzyl-5-hydroxymethylimidazole, 2-methyl-4,5-diphenylimidazole, 2,3,5-triphenylimidazole, 2-styrylimidazole, 1-(dodecyl benzyl)-2-methylimidazole, 2-(2-hydroxyl-4-t-butylphenyl)-4,5-diphenylimidazole, 2-(2-methoxyphenyl)-4,5-diphenylimidazole, 2-(3-hydroxyphenyl)-4,5-diphenylimidazole, 2-(p-dimethyl-aminophenyl)-4,5-diphenylimidazole, 2-(2-hydroxyphenyl)-4,5-diphenylimidazole, di(4,5-diphenyl-2-imidazole)-benzene-1,4, 2-naphthyl-4,5-diphenylimidazole, 1-benzyl-2-methylimidazole, and 2-p-methoxystyrylimidazole.

In one embodiment, the secondary curing agent may include at least one tertiary amine. Illustrative suitable tertiary amines are selected from methyldiethanolamine, triethaniamine, diethylamionpropylamine, benzyldimethyl amine, m-xylylenedi(dimethylamine), N,N'-dimethylpiperazine, N-methylpyrrolidine, N-methyl hydrocypiperidine, N,N,N'N'-trtramethyldiaminoethane, N,N,N',N',N'-pentamethyldiethylenetriamine, tributyl amine, trimethyl amine, diethyldecyl amine, triethylene diamine, N-methyl morpholine, N,N,N'N'-tetramethyl propane diamine, N-methyl piperidine, N,N'-dimethyl-1,3-(4-piperidino)propane,Pyridine and the like. Other tertiary amines include 1,8-dizaobicyclo [5.4.0] undec-7-ene, 1,8-diazobicyclo[2.2.2]octane, 4-dimethylaminopyridine, 4-(N-pyrrolidino)pyridine, triethyl amine and 2,4,6-tris(dimethylaminomethyl)phenol, and combinations thereof.

In another embodiment, the secondary curing agent can comprise a combination of secondary curing agents. For example, a secondary curing agent comprising tertiary amines and imidazoles.

In another embodiment, the secondary curing agent can be in a liquid or solid form. Solid secondary curing agents may be selected from one or more of 2-methyl imidazole, 2-phenyl imidazole, 2-phenyl-4-methylimidazole, 2-(β-(2'-methylimidazoyl-(1')))-ethyl-4-6-diamino-s-triazine, and mixtures thereof. If desired, a solvated secondary curing agent can be combined with one or more other secondary curing agents.

A solid secondary curing agent can be solvated to enhance formulation with the primary curing agent. The method of solvation can be by pre-dissolving the solid secondary curing agent in a suitable carrier. Examples of such a carrier can be a solvent, a plasticizer or another compound. For example a solvent may be selected from one or more of ethyl alcohol, methyl alcohol, dimethylformamide, others and combinations thereof. The plasticizer may be selected from benzyl alcohol, others and combinations thereof. Other compounds may be selected from poly(oxy(methyl-1,2-ethanediyl)), alpha-(2-aminomethylethyl) omega-(2-aminomethylethoxy) (JEFFAMINE® D 230, D-400), others and combinations thereof.

In one aspect of the invention, after solvating the solid secondary curing agent, the solution can be mixed with the primary curing agent. Prior to mixing of the curing component with and the epoxy component to form the epoxy resin composition, the carrier can be removed (temporary carrier) or not (permanent carrier). The carrier can be removed by evaporation with or without the use of vacuum and/or heating.

The epoxy component includes at least one epoxy resin. The epoxy components may include about 30% to about 92% by weight of the composition, or between about 50% to about 85% by weight of the composition. The epoxy resin can consist of a single resin, or it can be a mixture of mutually compatible epoxy resins.

The epoxy resin may include, but is not limited to, bi-functional epoxies, such as, bisphenol-A and bisphenol-F resins. Multifunctional epoxy resin, as utilized herein, describes compounds containing two or more 1,2-epoxy groups per molecule. Epoxide compounds of this type are well known to those of skill in the art and are described in Y. Tanaka, "Synthesis and Characteristics of Epoxides", in C. A. May, ed., *Epoxy Resins Chemistry and Technology* (Marcel Dekker, 1988), which is incorporated herein by reference in its entirety.

One class of epoxy resins suitable for use in the present disclosure comprises the glycidyl ethers of polyhydric phenols, including the glycidyl ethers of dihydric phenols. Illustrative examples include, but are not limited to, the glycidyl ethers of resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl) propane, 2,2-bis-(4-hydroxyphenyl)-propane (commercially known as bisphenol A), bis-(4-hydroxyphenyl)-methane (commercially known as bisphenol-F, and which may contain varying amounts of 2-hydroxyphenyl isomers), and the like, or any combination thereof. Additionally, advanced dihydric phenols of the following structure also are useful in the present disclosure:

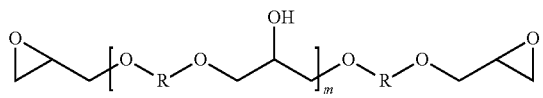

where m is an integer, and R is a divalent hydrocarbon radical of a dihydric phenol, such as those dihydric phenols listed above. Materials according to this formula can be prepared by polymerizing mixtures of a dihydric phenol and epichlorohydrin, or by advancing a mixture of a diglycidyl ether of the dihydric phenol and the dihydric phenol. While in any given molecule the value of m is an integer, the materials are invariably mixtures which can be characterized by an average value of m which is not necessarily a whole number. Polymeric materials with an average value of m between 0 and about 7 can be used in one aspect of the present disclosure. In other embodiments, the epoxy component may be a polyglycidyl amine from one or more of 2,2'-methylene dianiline, m-xylene dianiline, hydantoin, and isocyanate.

The epoxy component may be at least one cycloaliphatic (alicyclic) epoxide. Examples of suitable cycloaliphatic epoxides include diepoxides of cycloaliphaitc esters of dicarboxylic acids such as bis(3,4-epoxycyclohexylmethyl)oxalate, bis(3,4-epoxycyclohexylmethyl)adipate, bis(3,4-epoxy-6-methylcyclohexylmethyl)adipate, vinylclohexene diepoxides; limonene diepoxide;bis(3,4-epoxycyclohexylmethyl)pimelate; dicyclopentadiene diepoxide; and other suitable cycloaliphatic epoxides. Other suitable diepoxides of cycloaliphatic esters of dicarboxylic acids are described, for example, in Patent No. WO 2009/089145 A1, which is hereby incorporated by reference in its entirety.

Other cycloaliphatic epoxides include 3,3-epoxycyclohexylmethyl-3,4-epoxycyclohexane carboxylate such as 3,4-epoxycyclohexylmethyl-3,4-epoxycyclohexane carboxylate; 3,3-epoxy-1-methylcyclohexyl-methyl-3,4-epoxy-1-methylcyclohexane carboxylate; 6-methyl-3,4-epoxycyclohexyl-methylmethyl-6-methyl-3,4-epoxycyclohexane carboxylate; 3,4-epoxy-2-methylcyclohexyl-methyl-3,4-epoxy-3-methylcyclohexane carboxylate. Other suitable 3,4-epoxycyclohexylmentyl-3,4-epoxycyclohexane carboxylates are described, for example, in U.S. Pat. No. 2,890,194, which is hereby incorporated by reference in its entirety. In other embodiments, the epoxy component may include polyol polyglycidyl ether from polyethylene glycol, polypropylene glycol or polytetrahydrofuran or combinations thereof.

In another aspect, epoxy novolac resins, which are the glycidyl ethers of novolac resins, can be used as multifunctional epoxy resins in accordance with the present disclosure. In yet another aspect, the at least one multifunctional epoxy resin is a diglycidyl ether of bisphenol-A (DGEBA), an advanced or higher molecular weight version of DGEBA, a diglycidyl ether of bisphenol-F, an epoxy novolac resin, or any combination thereof. Higher molecular weight versions or derivatives of DGEBA are prepared by the advancement process, where excess DGEBA is reacted with bisphenol-A to yield epoxy terminated products. The epoxy equivalent weights (EEW) for such products range from about 450 to 3000 or more. Because these products are solid at room temperature, they are often referred to as solid epoxy resins.

DGEBA or advanced DGEBA resins are often used for structural formulations due to a combination of their low cost and generally high performance properties. Commercial grades of DGEBA having an EEW ranging from about 174 to about 250, and more commonly from about 185 to about 195, are readily available. At these low molecular weights, the epoxy resins are liquids and are often referred to as liquid epoxy resins. It is understood by those skilled in the art that most grades of liquid epoxy resin are slightly polymeric, since pure DGEBA has an EEW of 174. Resins with EEW's between 250 and 450, also generally prepared by the advancement process, are referred to as semi-solid epoxy resins because they are a mixture of solid and liquid at room temperature. Generally, multifunctional resins with EEW's based on solids of about 160 to about 750 are useful in the present disclosure. In another aspect, the multifunctional epoxy resin has an EEW in a range from about 170 to about 250.

Depending upon the end-use application, it can be beneficial to reduce the viscosity of the compositions of the present disclosure by modifying the epoxy component. The epoxy component, which comprises at least one multifunctional epoxy resin, further comprises a monofunctional epoxide. Examples of monoepoxides include, but are not limited to, styrene oxide, cyclohexene oxide and the glycidyl ethers of phenol, cresols, tert-butylphenol, other alkyl phenols, butanol, 2-ethylhexanol, $C_4$ to $C_{14}$ alcohols, and the like, or combinations thereof. The multifunctional epoxy resin can also be present in a solution or emulsion, with the diluent being water, an organic solvent, or a mixture thereof.

According to certain embodiments, the epoxy system formulation for the composite may include additives, such as, but not limited to, non-reactive plasticizer(s), filler(s), processing aid(s), stabilizer, air release agent, viscosity modifier(s), UV absorbent agent, a flame retardant, and/or an impact modifier. The amount of such additives can range from about 0.1 to about 30 wt. % of the epoxy formulation and typically about 2 to about 5 wt. %.

Nanomaterials are generally used as secondary reinforcement to enhance the thermal, mechanical and chemical properties of matrix resin. Nanomaterials, as utilized herein, include materials, wherein the individual particles or subcomponents of the nanomaterial have at least one dimension 100 nanometers or less. Nanomaterials, include, but are not limited to, multi-wall carbon or boron nitride nanotubes, single-wall carbon, carbon or boron nitride nanoparticles, carbon or boron nitride nanofibers, carbon or boron nitride nanoropes, carbon or boron nitride nanoribbons, nanoclays; nanoclays comprising tubules; layered inorganic clay material; talc; carbon black; cellulose fibers; silica; and alumina. The amount of nanomaterials can range from about 0.1% to 99%- to about 0.1 to 5% wt. %.

One embodiment of the present disclosure includes an epoxy composite. To form an epoxy composite, the epoxy resin composition includes reinforcing fibers. Reinforcing fibers for the fiber composite of the present disclosure may include customary fibers which are used for fiber reinforcement of materials. Suitable reinforcing fibers include organic or inorganic fibers, natural fibers or synthetic fibers, and may be present in the form of wovens or non-crimp fabrics, non-woven webs or mats, and also in the form of fiber stands (rovings), or staple fiber formed of continuous or discontinuous fiber such as fiberglass, E glass fiber, S glass fiber, S-2 GLASS®, fiber or C glass, fiber, silicon carbide or disilicon carbide containing titanium fiber, carbon/graphite fiber, boron fiber, quartz, aluminium oxide, carbon nanotubes, nano composite fibers, polyaramide fibers such as those sold under the trade name KEVLAR®, Poly(p-phenylene benzobisoxazole) fiber such as those sold under the trade name ZYLON®, ultrahigh molecular weight polyethylene fibers such as those sold under the trade name SPECTRA®, high and low density polyethylene fibers, polypropylene fibers, nylon fibers, cellulose fibers, natural fibers, biodegradable fibers and combinations thereof. Other suitable fibers include silicon carbide fiber, such as NICALON™ from Nippon Carbon Company; and Silicon carbide fibers containing titanium, such as TYRRANOT™ from Ube America, Inc. S-2 GLASS® is a registered trademark of AGY Holding Corp. KEVLAR® is a registered trademark of E. I. du Pont de Nemours and Company. ZYLON® is a registered trademark of Toyo Boseki Kabushiki Kaisha, Ta Toyobo Co., Ltd. SPECTRA® is a registered trademark of Honeywell International Inc.

These fibers (wovens or non-wovens) can be coated with the solvent or solvent free epoxy resin mixture by the standard impregnating methods, in particular for filament winding, pultrusion, sheet molding compound, bulk molding compound autoclave molding, resin infusion, vacuum assisted resin transfer molding, hand lay-up, resin impregnation, prepreg, compression molding, brushing, spraying, or dipping, casting, injection molding or combination thereof.

Mixing of the curing component and the epoxy component to form the epoxy resin composition can be in any order and by any appropriate means known in the art for two component epoxy compositions. The mixing may be accomplished according to any known method for mixing, including, but not limited to, mixing by magnetic stirrers, high shear mixing, hand mixing, mechanical mixing or other suitable mixing method. The mixing of the curing component is preferably carried out at a temperature in the range of 0° to 150° C., preferably 30° to 60° C.

The curable epoxy resin compositions and cured products described herein may be useful as adhesives, structural and electrical laminates, coating, casting, structural components for aerospace industries, and as circuit boards and the like for the electronics industry, among other applications. The curable epoxy resin compositions disclosed herein may also be used in electrical varnishes, encapsulants, semiconductors, general molding powders, filament wound pipe, storage tanks, liners for pumps, and corrosion resistant coatings, and other suitable epoxy containing products.

EXAMPLES

Example 1

Curing component compositions were formulated with a primary curing agent (cycloaliphatic diamine) and a solvated solid secondary curing agents (imidazole) to make the liquid curing component used according to this disclosure. Commercial imidazoles are either sold in a liquid or solid form. The solubility of liquid imidazoles in cycloaliphatic diamines is sufficient for purposes of the instant invention, meaning that liquid imidazoles will have good compatibility with such amines. Solid imidazoles, such as AMI-2, were solvated using a temporary carrier such as the solvent shown in Table 1. In Example 1 4,4'-methylenebiscyclohexanamine (PACM) was used as primary curing agent and 2-methyl imidazole (AMI-2) as secondary curing agent, which was solvated in ethyl alcohol. Formulations Ref 1-0 and Ref 1-1 are comparative examples wherein Formulation Ref 1-0 is a curing agent formulation without secondary curing agent and Formulation Ref 1-1 is a curing agent formulation with a non-solvated solid secondary curing agent. In all Examples, the curing agent formulation was evaluated with Ancarez® 4010 (EEW=187) epoxy resin. The use of a non-solvated solid secondary curing agent, as in Formulation Ref 1-1, resulted in a curing component with precipitates, which gave flawed results. Formulations 1-1, 1-2 and 1-3, according to the invention of the present disclosure, i.e. the use of a solvated solid secondary curing agent, showed an increase in $T_g$ along with a lower $T_{peak}$, indicating a faster reaction. The Tpeak and the Tg were measured by using a TA DSC Q200 and in accordance with ISO 11357. For dynamic DSC scans, samples (5-15 mg) were sealed in aluminum pans and heated up to 260-300° C. from room temperature at a rate of 10° C./min. Typical curing characteristics (peak temperature Tpeak) were determined from the first heating curve, while a second scan was performed to determine glass transition (Tg). Besides, the results indicated that the amount of secondary curing agent is crucial. Formulation 1-2, which contains 1 part of AMI-2, provides desirable thermal properties, i.e. the lowest $T_{peak}$ along with the highest $T_g$.

TABLE 1

PACM-based curing agent components and properties when cured with epoxy

| | Formulation | | | | |
|---|---|---|---|---|---|
| | Ref 1-0 | Ref 1-1 | 1-1 | 1-2 | 1-3 |
| Primary curing agent | | | | | |
| PACM (g) | 100 | 99 | 99.5 | 99 | 98 |
| Secondary curing agent | | | | | |
| Solid AMI-2 (g) | | 1 | | | |
| Solvated AMI-2 (g)[1] | | | 0.5 | 1 | 2 |
| Appearance of curing component compositions | Clear | Precipitate | Clear | Clear | Clear |
| Use level with LER EEW = 187 (phr) | 28 | — | 28 | 28 | 28 |
| DSC first scan $T_{peak}$ (° C.) | 110 | — | 109 | 110 | 108 |
| DSC second scan $T_g$ (° C.) | 145 | — | 155 | 153 | 138 |
| DSC $T_g$ (° C.) Cured 2 hrs @ 80° C. + 3 hrs @ 150° C. | 144 | — | 154 | 154 | 146 |

[1] solid secondary curing agent dissolved in ethyl alcohol (40 wt./vol.)

Example 2

A similar approach to Example 1 was utilized in Example 2, but with IPDA as primary curing agent and 2-methyl imidazole (AMI-2) as secondary curing agent, which was solvated in ethyl alcohol. The results are reported in Table 2. Formulation Ref 2-0 is a comparative example without secondary curing agent. Formulations 2-1 and 2-2, according to the invention of the present disclosure, i.e. the use of a solvated solid secondary curing agent, showed an increase in $T_g$ along with a lower $T_{peak}$, indicating a faster reaction. Besides, the results indicated that the amount of secondary curing agent is crucial. Formulation 2-2, which contains 1 part of AMI-2, provides desirable thermal properties, i.e. the low $T_{peak}$ along with a high $T_g$.

TABLE 2

IPDA-based curing agent components and
properties when cured with epoxy

| | Formulation | | |
|---|---|---|---|
| | Ref 2-0 | 2-1 | 2-2 |
| Primary curing agent | | | |
| IPDA (g) | 100 | 99.5 | 99 |
| Secondary curing agent | | | |
| Solvated AMI-2 (g)[1] | — | 0.5 | 1 |
| Appearance of curing component compositions | Clear | Clear | Clear |
| Use level with LER EEW = 187 (phr) | 23 | 23 | 23 |
| DSC first scan $T_{peak}$ (° C.) | 107 | 103 | 105 |
| DSC second scan $T_g$ (° C.) | 152 | 115 | 147 |
| DSC $T_g$ (° C.) | 138 | 132 | 155 |
| Cured 2 hrs @ 80° C. + 3 hrs @ 150° C. | | | |

[1]solid secondary curing agent dissolved in ethyl alcohol (40 wt./vol.)

Example 3

Example 3 utilizes a different classes of curing agent chemistry including a mixture of a cycloaliphatic diamine (PACM) with an aliphatic diamine (Ancamine® 2655 curing agent), In Table 3, a blend of PACM and Ancamine 2655 curing agent was used as a primary curing agent and mixed with various secondary curing agents. Solid imidazoles, such as AMI-2 and 2-PZ, were solvated using a temporary carrier such as the solvent shown in Table 1. Both curing agents were mixed in the amount shown in Table 1. To enable use of the solid secondary curing agents, these were pre-dissolved separately in ethyl alcohol. Formulations Ref 3-0 and Ref 3-1 are comparative examples wherein Formulation Ref 3-0 is a curing agent formulation without secondary curing agent and Formulation Ref 3-1 is a curing agent formulation with a liquid secondary curing agent. Formulation Ref 3-1 showed an increase in $T_g$ versus the Formulation Ref 3-0, which was due to the use of a liquid secondary curing agent. Formulations 3-1 and 3-2, according to the invention of the present disclosure, i.e. the use of a solvated solid secondary curing agent, showed an increase in $T_9$ along with a lower $T_{peak}$, indicating a faster reaction.

Referring now to FIG. 1, FIG. 1 shows the dynamic conversion curves of Ref 3-0 and 3-1. The dynamic conversion measures the degree to which an epoxy resin has been cured, crosslinked or hardened. The conversion percentage as a function of temperature was measured using the first heating curve of a DSC scan. Conversion was determined by dividing partial areas by the total area of the curing peak.

TABLE 3

Curing agent components and properties when cured with epoxy

| | Formulation | | | |
|---|---|---|---|---|
| | Ref 3-0 | Ref 3-1 | 3-1 | 3-2 |
| Primary curing agent | | | | |
| PACM (g) | 90 | 89 | 89 | 89 |
| Ancamine 2655 (g) | 10 | 10 | 10 | 10 |
| Secondary curing agent | | | | |
| AMI-1 (g) | — | 1 | — | — |
| Solvated AMI-2 (g)[1] | — | — | 1 | — |
| Solvated 2-PZ (g)[1] | — | — | — | 1 |
| Appearance of curing component compositions | Clear | Clear | Clear | Clear |
| Use level with LER EEW = 187 (phr) | 23 | 23 | 23 | 23 |
| DSC first scan $T_{peak}$ (° C.) | 112 | 112 | 107 | 106 |
| DSC second scan $T_g$ (° C.) | 119 | 150 | 153 | 143 |
| DSC $T_g$ (° C.) | — | 163 | 155 | 147 |
| Cured 2 hrs @ 80° C. + 3 hrs @ 150° C. | | | | |

[1]solid secondary curing agent dissolved in ethyl alcohol (40 wt./vol.)

Example 4

A similar approach to Example 3 was utilized in Example 4, but with PACM as a primary curing agent and 2-methyl imidazole (AMI-2) as secondary curing agent, which was pre-dissolved in a polyether diamine (Jeffamine® D-230). The results are reported in Table 4. Formulation Ref 4-0 is a comparative example with a curing agent formulation without secondary curing agent. Formulations 4-1, 4-2 and 4-3, according to the invention of the present disclosure, i.e. the use of a solvated solid secondary curing agent, showed an increase in $T_g$. The results indicated that the amount of secondary curing agent is crucial. Formulation 4-1, which contains 0.5 part of AMI-2, provides desirable thermal properties, i.e. the highest $T_g$.

TABLE 4

Curing agent components and properties when cured with epoxy

| | Formulation | | | |
|---|---|---|---|---|
| | Ref 4-0 | 4-1 | 4-2 | 4-3 |
| Primary curing agent | | | | |
| PACM (g) | 90 | 89.5 | 89 | 88 |
| Secondary curing agent | | | | |
| Jeffamine D-230 (g) | 10 | 10 | 10 | 10 |
| AMI-2 (g)[1] | — | 0.5 | 1 | 2 |
| Appearance of curing component compositions | Clear | Clear | Clear | Clear |
| Use level with LER EEW = 187 (phr) | 29 | 29 | 29 | 29 |
| DSC first scan $T_{peak}$ (° C.) | 110 | 114 | 114 | 111 |
| DSC second scan $T_g$ (° C.) | 147 | 149 | 139 | 123 |
| DSC $T_g$ (° C.) | 147 | 150 | 149 | 144 |
| Cured 2 hrs @ 80° C. + 3 hrs @ 150° C. | | | | |

[1]solid secondary curing agent pre-dissolved in Jeffamine D-230

Example 5

As shown in the previous examples, high thermal properties are achieved by adjusting the curing component composition without modifying the resin chemistry thereby also enhancing handling of epoxy resins. Example 5 includes one curing agent chemistry, i.e. PACM, and the results in Table 5 show the effect of the amount curing component composition added to the epoxy resin composition. Formulation Ref 1-0 is comparative example with a curing agent formulation without secondary curing agent. Formulation 1-2 is the formulation with secondary curing agent used in correct stoichiometry. The Formulations 5-1 and 5-2 are with secondary curing agent under stoichiometry of amine to epoxy. The results in Table 5 show that Formulation 4-1, which contains 1 part of AMI-2 and a use level of 26 phr, provides desirable thermal properties, i.e. the highest $T_g$ with a low $T_{peak}$, indicating a faster reaction.

TABLE 5

Curing agent components and properties when cured with epoxy

| | Formulation | | | |
|---|---|---|---|---|
| | Ref 1-0 | 1-2 | 5-1 | 5-2 |
| Primary curing agent | | | | |
| PACM (g) | 100 | 99 | 99 | 99 |
| Secondary curing agent | | | | |
| AMI-2 (g)[1] | — | 1 | 1 | 1 |
| Use level with LER EEW = 187 (phr) | 28 | 28 | 26 | 24 |
| DSC first scan $T_{peak}$ (° C.) | 110 | 110 | 108 | 107 |
| DSC second scan $T_g$ (° C.) | 145 | 153 | 158 | 154 |
| DSC $T_g$ (° C.) Cured 2 hrs @ 80° + 3 hrs @ 150° C. | 144 | 155 | 153 | 149 |

[1]solid secondary curing agent dissolved in ethyl alcohol (40 wt./vol.)

Example 6

A similar approach to Example 4 was utilized in Example 6, but with PACM as a primary curing agent and 2-methyl imidazole (AMI-2) as secondary curing agent, which was pre-dissolved in benzyl alcohol. The results are reported in Table 6. Formulations Ref 6-0 is a comparative example with a curing agent formulation without secondary curing agent. Formulations 6-1, 6-2 and 6-3, according to the invention of the present disclosure, i.e. the use of a solvated solid secondary curing agent, showed an increase in $T_g$. The results indicated that the amount of secondary curing can be tailored to achieve desirable thermal properties. Formulation 6-2, which contains 1 part of AMI-2, provides desirable thermal properties, i.e. the highest $T_g$.

TABLE 6

Curing agent components and properties when cured with epoxy

| | Formulation | | | |
|---|---|---|---|---|
| | Ref 6-0 | 6-1 | 6-2 | 6-3 |
| Primary curing agent | | | | |
| PACM (g) | 50 | 49.75 | 49.5 | 49 |
| Secondary curing agent | | | | |
| Benzyl alcohol (g) | 50 | 49.75 | 49.5 | 49 |
| AMI-2 (g)[1] | — | 0.5 | 1 | 2 |
| Appearance of curing component compositions | Clear | Clear | Clear | Clear |
| Use level with LER EEW = 187 (phr) | 56 | 56 | 56 | 56 |
| DSC first scan $T_{peak}$ (° C.) | 97 | 97 | 98 | 97 |
| DSC $T_g$ (° C.) Cured at ambient temperature | 46 | 46 | 48 | 46 |
| DSC $T_g$ (° C.) Cured 2 hrs @ 80° C. | 44 | 49 | 50 | 49 |

[1]solid secondary curing agent pre-dissolved in benzyl alcohol

While the invention has been described with reference to a preferred embodiment, it will be understood by those skilled in the art that various changes may be made and equivalents may be substituted for elements thereof without departing from the scope of the invention. For example, the embodiments disclosed herein can be used alone or in combination with other embodiments. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An epoxy resin composition comprising: an epoxy component and a curing component;
    wherein the epoxy component comprises at least one epoxy resin having two or more 1,2-epoxy groups per molecule, and the epoxy component is present in an amount of about 30% to about 92% by weight of the epoxy resin composition;
    wherein the curing component comprises: a reactive primary curing agent comprising at least one polyamine; and a secondary curing agent composition;
    wherein the secondary curing agent composition comprises at least one secondary curing agent solvated in a carrier comprising at least one member selected from the group consisting of ethyl alcohol, benzyl alcohol, and a polyether amine, provided that said polyether amine is not present as the at least one polyamine of the reactive primary curing agent when the carrier comprises polyether amine;
    wherein the at least one secondary curing agent comprises at least one imidazole, and the at least one secondary curing agent is present in an amount of about 0.001% to about 5% by weight of the epoxy resin composition;
    wherein the carrier is present in an amount of about 30 to about 99.9% by weight of the secondary curing agent composition; and
    wherein the reactive primary curing agent is present in an amount of about 8% to about 70% by weight of the epoxy resin composition, such that the number of reactive group equivalents present in the curing component is from about 0.50 to 0.98 times the number of epoxide group equivalents present in the epoxy component.

2. The epoxy resin composition of claim 1, wherein the number of reactive group equivalents present in the curing component is from about 0.70 to 0.95 times the number of epoxide group equivalents present in the epoxy component.

3. A cured epoxy resin composition formed by curing the epoxy resin composition of claim 2 at a curing temperature of less than about 150° C.

4. The epoxy resin composition of claim 1, wherein the number of reactive group equivalents present in the curing component is about 0.80 times the number of epoxide group equivalents present in the epoxy component.

5. A cured epoxy resin composition formed by curing the epoxy resin composition of claim 4 at a curing temperature of less than about 150° C.

6. The epoxy resin composition of claim 1, wherein the reactive primary curing agent is present in an amount of about 15% to about 50% by weight of the epoxy resin composition.

7. The epoxy resin composition of claim 1, wherein the at least one secondary curing agent is present in an amount of about 0.5% to about 2.5% by weight of the epoxy resin composition.

8. The epoxy resin composition of claim 1, further comprising a reinforcing fiber.

9. A cured epoxy resin composition formed by curing the epoxy resin composition of claim 8 at a curing temperature of less than about 150° C.

10. The epoxy resin composition of claim 8, wherein the reinforcing fiber is selected from the group consisting of woven or non-crimp fabrics, nonwoven webs or mats, fiber stands, staple fiber formed of continuous or discontinuous fiber and combinations thereof.

11. A cured epoxy resin composition formed by curing the epoxy resin composition of claim 10 at a curing temperature of less than about 150° C.

12. The epoxy resin composition of claim 8, wherein the reinforcing fiber is selected from the group consisting of fiberglass, carbon fiber, carbon nanotubes, nano composite fibers, polyaramide fibers, poly(p-phenylene benzobisoxazole) fiber, ultrahigh molecular weight polyethylene fibers, high density polyethylene fibers, low density polyethylene fibers, polypropylene fibers, polyamide fibers, cellulose fibers, natural fibers, biodegradable fibers and combinations thereof.

13. A cured epoxy resin composition formed by curing the epoxy resin composition of claim 12 at a curing temperature of less than about 150° C.

14. The epoxy resin composition of claim 1, wherein the at least one polyamine is selected from the group consisting of aliphatic polyamine, arylaliphatic polyamine, cycloaliphatic polyamine, aromatic polyamine, heterocyclic polyamine and polyalkoxypolyamine, and combinations thereof; wherein the alkoxy of the polyalkoxypolyamine is an oxyethylene, oxypropylene, oxy-1,2-butylene, oxy-1,4-butylene or co-polymer thereof.

15. The epoxy resin composition of claim 14, wherein:
the aliphatic polyamine is selected from the group consisting of diethylenetriamine, triethylenetetramine, teraethylenepentamine, pentaethylenehexamine, hexamethylenediamine, N-(2-aminoethyl) -1,3-propanediamine, N,N'-1,2-ethanediylbis-1,3-propanediamine, and dipropylenetriamine;
the arylaliphatic polyamine is selected from the group consisting of m-xylylenediamine and p-xylylenediamine;
the cycloaliphatic polyamine is selected from the group consisting of 1,3-bisaminocyclohexylamine, isophorone diamine, 4,4'-methylenebiscyclohexanamine, and 4,4'-Methylenebis-(2-methyl-cyclohexanamine);
the aromatic polyamine is selected from the group consisting of m- phenylenediamine, diaminodiphenylmethane, and diaminodiphenylsulfone;
the heterocyclic polyamine is selected from the group consisting of N-aminoethylpiperazine and 3,9-bis(3-aminopropyl)2,4,8,10-tetraoxaspiro(5,5)undecane; and
the polyalkoxypolyamine is selected from the group consisting of 4,7-dioxadecane-1,10-diamine, 1-propanamine,3,3'-(oxybis(2,1-ethanediyloxy))bis(diaminopropylated diethylene glycol), poly(oxy(methyl-1,2-ethanediyl)), alpha-(2-aminomethylethyl) omega-(2-aminomethylethoxy), triethyleneglycoldiamine, poly(oxy(methyl-1,2-ethanediyl)), alpha,alpha'-(oxydi-2,1-ethanediyl)bis(omega-(aminomethylethoxy)), bis(3-aminopropyl)polytetrahydrofuran, poly(oxy(methyl-1, 2-ethanediyl)), a-hydro-w-(2-aminomethylethoxy) ether with 2-ethyl-2-(hydroxymethyl)-1,3-propanediol, and diaminopropyl dipropylene glycol.

16. The epoxy resin composition of claim 15, wherein:
the aliphatic polyamine is selected from the group consisting of diethylenetriamine and triethylenetetramine;
the cycloaliphatic polyamine is 1,3-bisaminocyclohexylamine;
the cycloaliphatic polyamine is selected from the group consisting of isophoronediamine and 4,4'-methylenebiscyclohexanamine;
the heterocyclic polyamine is N-aminoethylpiperazine; and
the polyalkoxypolyamine is selected from the group consisting of 4,7-dioxadecane-1,10-diamine,1-propanamine, 3,3'-(oxybis(2,1-ethanediyloxy))bis (diaminopropylated diethylene glycol), poly(oxy(methyl-1,2-ethanediyl)), alpha-(2-aminomethylethyl) omega-(2-aminomethylethoxy) triethyleneglycoldiamine, and poly(oxy(methyl-1,2-ethanediyl))alpha,alpha'-(oxy(di-2,1-ethanediyl))bis (omega-(aminomethylethoxy)).

17. The epoxy resin composition of claim 1, wherein the reactive primary curing agent further comprises at least one multifunctional amine having a structure of

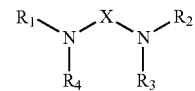

where $R_1$ is $CH_2CH_2CH_2NH_2$; $R_2$, $R_3$ and $R_4$ independently are H or $CH_2CH_2CH_2NH_2$; and X is $CH_2CH_2$ or $CH_2CH_2CH_2$.

18. The epoxy composition of claim 17, wherein $R_2$ and $R_3$ are not H simultaneously.

19. The epoxy resin composition of claim 1, wherein the at least one imidazole is selected from the group consisting of 1-methyl imidazole, 2-methyl imidazole, 2-alkyl imidazole where the alkyl group has 10 to 18 carbon atoms, 2-ethyl-4-methyl imidazole, 2-phenyl imidazole, 1-phenyl-2-methyl imidazole, 2-heptadecylimidazole, 1-cyanoethyl-2-phenylimidazole-trimellitate, 2-(β-(2'-methylimidazoyl-(1')))-ethyl-4-6-diamino-s-triazine, 2,4-dimethylimidazole 2-undecylimidazole, 2-heptadecenyl-4-methylimidazole, 2-heptadecylimidazole, 2-phenyl-4-methylimidazole, 1-benzyl-2-methylimidazole, 2-ethylimidazole, 2-isopropylimidazole, 2-phenyl-4-benzylimidazole, 2-vinylimidazole, 1-vinyl-2-methylimidazole, 1-propyl-2-methylimidazole, 1-(3-aminopropyl)-imidazole, butylimidazole 1-cyanoethyl-2-methylimidazole, 1-cyanoethyl-2-ethyl-4-methylimidazole, 1-cyanoethyl-2-undecylimidazole, 1-guanaminoethyl-2-methylimidazole, 1-cyanoethyl-2-isopropylimidazole, 1-cyanoethyl-2-phenylimidazole, 1-aminoethyl-2-methylimidazole, 2-phenyl-4,5-dihydroxymethylimidazole, 2-phenyl-4-methyl-5-hydroxymethylimidazole, 2-phenyl-4-benzyl-5-hydroxymethylimidazole, 2-methyl-4,5-diphenylimidazole, 2,3,5-triphenylimidazole, 2-styrylimidazole, 1-(dodecyl benzyl)-2-methylimidazole, 2-(2-hydroxyl-4-t-butylphenyl)-4, 5-diphenylimidazole, 2-(2-methoxyphenyl)-4,5-diphenylimidazole, 2-(3-hydroxyphenyl)-4,5-diphenylimidazole, 2-(p-dimethyl-aminophenyl)-4,5-diphenylimidazole, 2-(2-hydroxyphenyl)-4,5-diphenylimidazole, di(4,5-diphenyl-2-imidazole)-benzene-1,4, 2-naphthyl-4,5-diphenylimidazole, 1-benzyl-2-methylimidazole, 2-p-methoxystyrylimidazole, and combinations thereof.

20. The epoxy resin composition of claim 1, wherein the at least one secondary curing agent further comprises at least one tertiary amine selected from the group consisting of methyldiethanolamine, triethanolamine, diethylamionpropylamine, benzyldimethyl amine, m-xylylenedi(dimethylamine), N,N'-dimethylpiperazine, N-methylpyrolidine, N-methyl hydroxypiperidine, N,N,N'N'-tetramethyldiaminoethane, N,N,N',N',N'-pentamethyldiethylenetriamine, tributyl amine, trimethyl amine, diethyldecyl amine, triethylene diamine, N-methyl morpholine, N,N,N'N'-tetramethyl propane diamine, N-methyl piperidine, N,N'-dimethyl-1,3-(4-piperidino)propane, pyridine, 1,8-dizaobicyclo[5.4.0]undec-7-ene, 1,8-diazobicyclo[2.2.2]octane, 4-dimethylaminopyridine, 4-(N-pyrolidino)pyridine, triethyl amine and 2,4,6-tris(dimethylaminomethyl)phenol, and combinations thereof.

21. The epoxy resin composition of claim 1, wherein the at least one secondary curing agent is a solid component prior to being solvated in the carrier.

22. The epoxy resin composition of claim 1, wherein the epoxy component comprises glycidyl ethers of polyhydric phenols.

23. The epoxy resin composition of claim 22, wherein the epoxy component comprises a diglycidyl ether of an advanced dihydric phenol of the following structure:

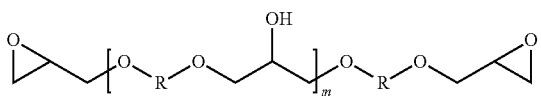

where m is an integer, and R is a divalent hydrocarbon radical of a dihydric phenol, and m has an average value between 0 and about 7.

24. The epoxy resin composition of claim 22, wherein the epoxy component comprises a glycidyl ether of 2,2-bis-(4-hydroxyphenyl)-propane, a glycidyl ether of bis-(4-hydroxyphenyl)-methane or combinations thereof.

25. The epoxy resin composition of claim 1, wherein the epoxy component comprises a multifunctional epoxy selected from the group consisting of diglycidyl ether of bisphenol-A, diglycidyl ether of bisphenol-F, epoxy novolac resin, and combinations thereof.

26. The epoxy resin composition of claim 1, wherein the epoxy component comprises a cycloaliphatic epoxide, a polyol polyglycidyl ether or combinations thereof.

27. The epoxy resin composition of claim 1 wherein the epoxy component comprises a polyglycidyl amine of at least one of 2,2'-methylene dianiline, m-xylene dianiline, hydantoin, and isocyanate.

28. The epoxy resin composition of claim 1, wherein the epoxy component further comprises a monoepoxide diluent selected from the group consisting of styrene oxide, cyclohexene oxide, glycidyl ether of phenol, glycidyl ether of cresols, glycidyl ether of tert-butylphenol, glycidyl ether of butanol, glycidyl ether of 2-ethylhexanol, glycidyl ether of $C_4$ to $C_{14}$ alcohols, and combinations thereof.

29. The epoxy resin composition of claim 1 wherein the carrier comprises ethyl alcohol.

30. The epoxy resin composition of claim 1 wherein the carrier comprises polyether amine.

31. The epoxy resin composition of claim 1 wherein the carrier comprises benzyl alcohol.

32. A cured epoxy resin composition formed by curing the epoxy resin composition of claim 1 at a curing temperature of less than about 150° C.

33. The cured epoxy resin composition of claim 32 having a glass transition temperature of greater than about 170° C.

34. The cured epoxy resin composition of claim 33 having a glass transition temperature of greater than about 220° C.

35. The cured epoxy resin composition of claim 34 having a glass transition temperature of greater than about 280° C.

36. The cured epoxy resin composition of claim 32, which is suitable for use as an adhesive, a laminate, a coating, a casting, a circuit board, a varnish, an encapsulant, a semiconductor, a general molding powder, a filament wound pipe, a storage tank, or a liner.

\* \* \* \* \*